(12) United States Patent
Cheng et al.

(10) Patent No.: US 10,902,050 B2
(45) Date of Patent: Jan. 26, 2021

(54) ANALYZING AND WEIGHTING MEDIA INFORMATION

(71) Applicant: International Business Machines Corporation, Armonk, NY (US)

(72) Inventors: Jacqueline Cheng, Taipei (TW); Micky Chiang, Taipei (TW); Di Ling Chen, Beijing (CN); Sharon Chen, New Taipei (TW); Si Er Han, High Tech Zone (CN); Pei-Yi Lin, New Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 234 days.

(21) Appl. No.: 15/706,659

(22) Filed: Sep. 15, 2017

(65) Prior Publication Data

US 2019/0087424 A1 Mar. 21, 2019

(51) Int. Cl.
*G06F 16/48* (2019.01)
*G10L 15/22* (2006.01)
(Continued)

(52) U.S. Cl.
CPC ............ *G06F 16/48* (2019.01); *G06F 16/13* (2019.01); *G06F 16/148* (2019.01); *G06F 16/433* (2019.01); *G06F 16/7834* (2019.01); *G06F 16/7837* (2019.01); *G10L 15/1815* (2013.01); *G10L 15/22* (2013.01); *G10L 15/26* (2013.01); *G10L 25/63* (2013.01); *G10L 25/87* (2013.01)

(58) Field of Classification Search
None
See application file for complete search history.

(56) References Cited

U.S. PATENT DOCUMENTS

| 8,510,317 B2 | 8/2013 | Boetje et al. |
| 9,087,131 B1 * | 7/2015 | Gundotra ............... G06Q 10/10 |

(Continued)

OTHER PUBLICATIONS

Ka-Ping Yee et al., "Faceted metadata for image search and browsing," Proceeding CHI '03 Proceedings of the SIGCHI Conference on Human Factors in Computing Systems, Apr. 5-10, 2003, pp. 401-408.

(Continued)

*Primary Examiner* — Hau H Hoang
*Assistant Examiner* — Hau Hoang
(74) *Attorney, Agent, or Firm* — Intelletek Law Group, PLLC; Gabriel Daniel, Esq.

(57) ABSTRACT

Speech-to-text analysis, emotion analysis, and time analysis are performed on a media file by a data processing system. The media file is divided, by the data processing system, into a first fragment and a second fragment based at least in part on the speech-to-text analysis, the emotion analysis, and the time analysis. Semantic analysis is performed, by the data processing system, on the first fragment and the second fragment based on a search query for the media file. A first weight is provided for the first fragment and a second weight is provided for the second fragment based on the semantic analysis, the emotion analysis, and the time analysis. The data processing system stores the first weight in association with the first fragment and the second weight in association with the second fragment.

21 Claims, 4 Drawing Sheets

(51) Int. Cl.
*G10L 15/18* (2013.01)
*G10L 25/63* (2013.01)
*G06F 16/13* (2019.01)
*G06F 16/14* (2019.01)
*G06F 16/432* (2019.01)
*G10L 25/87* (2013.01)
*G06F 16/783* (2019.01)
*G10L 15/26* (2006.01)

(56) References Cited

U.S. PATENT DOCUMENTS

| | | |
|---|---|---|
| 9,652,534 B1 | 5/2017 | Narayanan |
| 9,672,280 B2 | 6/2017 | Liu |
| 2012/0150890 A1 | 6/2012 | Jeong et al. |
| 2013/0073534 A1 | 3/2013 | French |
| 2014/0156641 A1 | 6/2014 | Tripoli et al. |
| 2015/0293996 A1* | 10/2015 | Liu .................. G06F 16/73 707/723 |
| 2016/0098998 A1 | 4/2016 | Wang et al. |
| 2017/0041556 A1* | 2/2017 | Aiba .................. H04N 5/77 |
| 2018/0035151 A1* | 2/2018 | Jassin ............ H04N 21/26258 |
| 2018/0300554 A1* | 10/2018 | Kansara ............ G06F 16/739 |

OTHER PUBLICATIONS

MediaSmarts, "How to Search the Internet Effectively", Tip Sheet.
EffectiveSoft Corporation, "Media Content Search and Classification".

* cited by examiner

ANALYZING AND WEIGHTING MEDIA INFORMATION

BACKGROUND

Technical Field

The present application generally relates to analyzing media information, and more particularly, to methods and systems of analyzing and searching media information.

Description of Related Art

Search engines are utilized to find information in response to a search term entered by a user. A search engine gathers information through various means, including obtaining information by systematically browsing the Internet for information using a spider or crawler, processing and indexing the information based on various different aspects, and searching through the information for the most relevant information based on the search term. Search engines typically utilize key words to search more quickly. Speed and accuracy are characteristics of better search engines.

SUMMARY

According to one or more embodiments, a method comprises performing, by a data processing system, speech-to-text analysis, emotion analysis, and time analysis on a media file and dividing the media file into a first fragment and a second fragment based at least in part on the speech-to-text analysis, the emotion analysis, and the time analysis. Semantic analysis is performed, by the data processing system, on the first fragment and the second fragment based on a search query for the media file. A first weight is provided for the first fragment and a second weight is provided for the second fragment based on the semantic analysis, the emotion analysis, and the time analysis by the data processing system. The data processing system stores the first weight in association with the first fragment and the second weight in association with the second fragment.

According to one or more embodiments, a media analysis system comprises a network adapter configured to receive, from a communication device, a search query and to communicate information associated with the search query to the communication device. At least one processor is arranged and constructed to perform speech-to-text analysis, emotion analysis, and time analysis on a media file; divide the media file into a plurality of fragments based at least in part on the speech-to-text analysis, the emotion analysis, and the time analysis; perform semantic analysis on the plurality of fragments based on the search query for the media file; provide a plurality of weights for the plurality of fragments based on the semantic analysis, the emotion analysis, and the time analysis; order the plurality of fragments according to weight; and communicate the plurality of fragments to the communication device with the highest weight fragment as most relevant.

According to one or more embodiments, a computer program product for a media analysis system comprises a computer readable storage medium having program instructions embodied therein, wherein the program instructions are executable by a device to cause the device to: perform speech-to-text analysis, emotion analysis, and time analysis on a media file; divide the media file into a plurality of fragments based at least in part on the speech-to-text analysis, the emotion analysis, and the time analysis; perform semantic analysis on the plurality of fragments based on a search query for the media file; provide a plurality of weights for the plurality of fragments based on the semantic analysis, the emotion analysis, and the time analysis; communicate the plurality of fragments according to weight.

BRIEF DESCRIPTION OF THE DRAWINGS

FIG. 6 is a view of enhanced search results displayed on a communication device in accordance with an exemplary embodiment.

DETAILED DESCRIPTION

Figure 1:
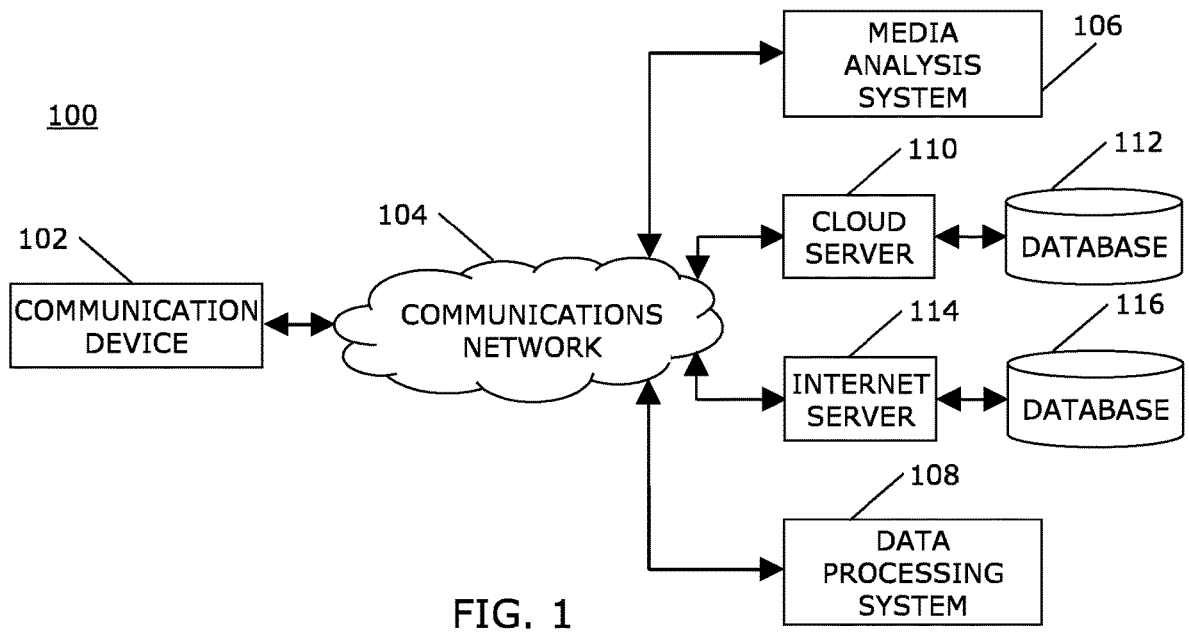
FIG. 1 is a block diagram of a system for analyzing and searching media information in accordance with an exemplary embodiment.

The following describes numerous specific details by way of examples in order to provide a thorough understanding of the relevant teachings. The present teachings may, however, be practiced without such details. In addition, well-known methods, procedures, components, and/or circuitry are described at a relatively high-level, without detail, in order to avoid unnecessarily obscuring aspects of the present teachings.

The one or more embodiments described herein provide an enhancement to search engine results. Search terms or search queries are typically entered as text. Search results tend to be very accurate when the search term involves text-based materials, such as articles, books, blogs, and other materials formed primarily from text. Search results are not very accurate when the searched materials are non-text materials, such as images, videos, audio, and so forth. Searching manually through non-text materials can be very time-consuming. For example, if a user wishes to find an architecture diagram that was displayed during a company training session that was recorded in a plurality of videos. The video metadata includes some text information that may be utilized in a keyword search. If the user wishes to find the fragment(s), also referred to as segments, of the videos that discuss the architecture diagram, the results may only return video fragments that discuss an architecture diagram, through speech-to-text conversion, or text with the words "architecture" and "diagram," but an architecture diagram would not be provided. Spending time forwarding and/or reversing through one or more videos to search for an image of an architecture diagram is very time consuming.

The present application may apply to a system, a method, and/or a computer program product. The computer program product may include a computer readable storage medium or media having computer readable program instructions stored therein for causing a processor to carry out aspects of the present application.

The computer readable storage medium may be a tangible device that retains and stores instructions for use by an instruction execution device. For example, the computer readable storage medium may be, but is not limited to, an electronic storage device, a magnetic storage device, an optical storage device, an electromagnetic storage device, a semiconductor storage device, or any suitable combination thereof. A non-exhaustive list of more specific examples of the computer readable storage medium includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as transitory signals per se, such as radio waves or other freely propagating electromagnetic waves, electromagnetic waves propagating through a waveguide or other transmission media, e.g., light pulses passing through a fiber-optic cable, or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present application may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter situation, the remote computer may be connected to a user's computer through any type of network, including a local area network (LAN) or a wide area network (WAN), or the connection may be made to an external computer (for example, through the Internet using an Internet Service Provider). In some embodiments, electronic circuitry, for example, programmable logic circuitry, field-programmable gate arrays (FPGA), or programmable logic arrays (PLA), may execute the computer readable program instructions by utilizing state information of the computer readable program instructions to characterize the electronic circuitry, in order to perform aspects of the present application Aspects of the present application are described herein with reference to flowchart illustrations and/or block diagrams of methods, apparatus (systems), and computer program products according to one or more embodiments. Each element of a flowchart and/or block diagram may be implemented by computer readable program instructions.

The computer readable program instructions may be provided to a processor of a general purpose computer, special purpose computer, or other programmable data processing apparatus to produce a machine, such that the instructions, which execute, via the processor of the computer or other programmable data processing apparatus, implementations of the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions that implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions that execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present application. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A block diagram of a system 100 for analyzing and searching media information is shown in FIG. 1 in accordance with an embodiment. A communication device 102 is typically associated with one or more users. The communication device 102 may be a wireless or wired/wireline, and portable or non-portable. Examples of communication devices 102 include, but are not limited to, cellular phones, smartphones, tablet computers, laptop computers, desktop computers, facsimile machines, wireless organizers, personal digital assistants, pagers, notebook computers, gaming devices, media players, electronic navigation devices, electronic whiteboards, and so forth.

The communications network 104 may be any type of wired, also known as wireline, or wireless network, including, but not limited to, data networks, voice networks, and networks that support both voice and data communications. The communications network 104 may comprise copper wires, optical fibers, wireless transmission, routers, firewalls, switches, gateway computers, and/or edge servers, separately or in any combination. The communications network may include, for example, the Internet, one or more local area networks, and one or more wide area networks.

Figure 2:
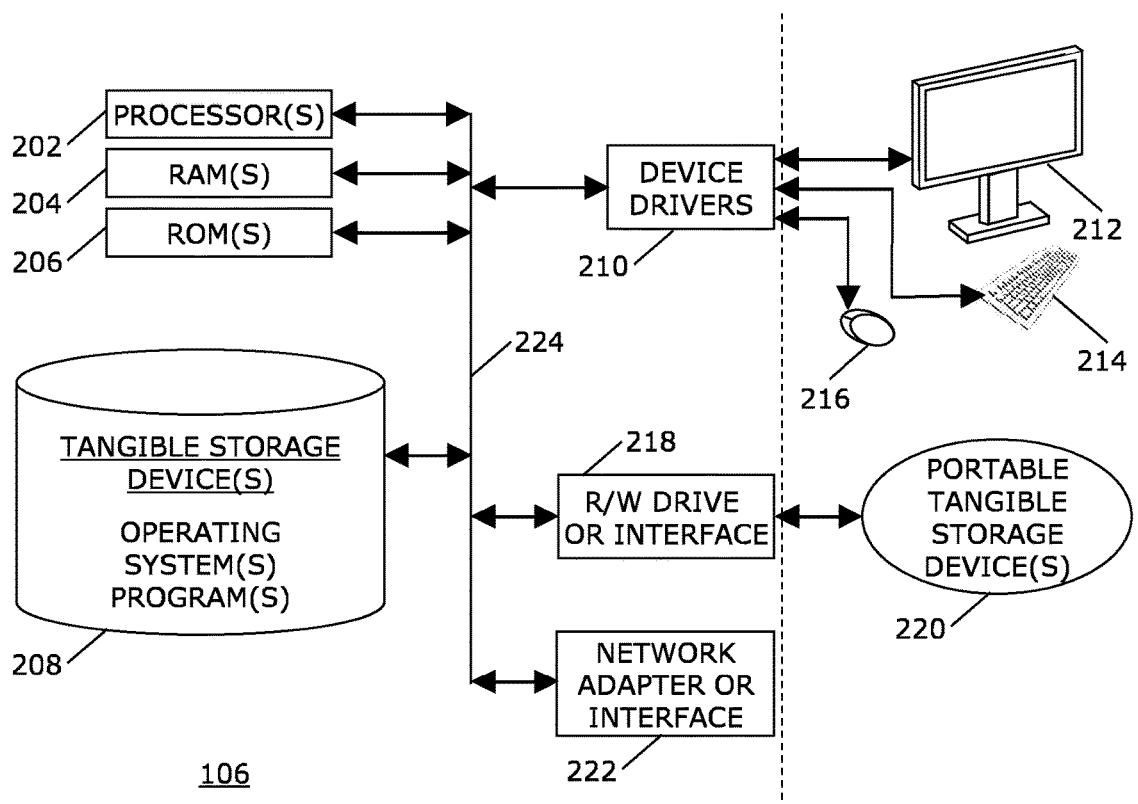
FIG. 2 is a block diagram of a data processing system in accordance with an exemplary embodiment.

A system for analyzing and searching media information 106, for example, as described with respect to FIG. 2, is a data processing system that is interfaced with the communications network 104. The system for analyzing and searching media information 106 may be, for example, an IBM Watson® computing system. The system 100 may optionally include another data processing system 108, a cloud server 110, and/or a database 112, and a Internet server 114 and/or a database 116 that the system for analyzing and searching media information 106 may utilize to store or access information for use in analyzing and searching media data. The other data processing system 108 may have a similar structure or architecture as the system for analyzing and searching media information 106.

A block diagram of a data processing system for analyzing and searching media information 106 in accordance with an embodiment is shown in FIG. 2. FIG. 2 provides only an illustration of one implementation and does not imply any limitations with regard to the environments in which different embodiments may be implemented. Many modifications to the depicted embodiment may be made, for example, based on design and implementation specifications.

The system for analyzing and searching media information 106 may be implemented in any electronic device capable of executing machine-readable program instructions, which may be referred to as a data processing system. The system for analyzing and searching media information 106 may be a smart phone, a computer system, PDA, or other electronic devices. Examples of computing systems, environments, and/or configurations in which the system for analyzing and searching media information 106 may be implemented include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The system for analyzing and searching media information 106 may include internal components, to the left of the dashed vertical line, and external components, to the right of the dashed vertical line, as illustrated in FIG. 2. The internal components include one or more processors 202, one or more computer-readable Random Access Memory devices (RAMs) 204, and one or more computer-readable Read Only Memory devices (ROMs) 206, and one or more computer-readable tangible storage devices 208 including one or more operating systems and one or more programs, all communicating over one or more buses 224. The operating system(s) and program(s), such as the program for analyzing and searching media information, are stored on the computer-readable tangible storage device(s) 208 for execution by the processor(s) 202 via the RAM(s) 204, which typically include cache memory. The computer-readable tangible storage device(s) 208 may be, for example, a magnetic disk storage device of an internal hard drive. Alternatively, one or more of the computer-readable tangible storage devices 208 may be a semiconductor storage device such as ROM 206, EPROM, flash memory, or any other computer-readable tangible storage device that stores a computer program and digital information.

The internal components also include a R/W drive or interface 218 that reads from and writes to one or more portable computer-readable tangible storage devices 220 such as a CD-ROM, DVD, memory stick, magnetic tape, magnetic disk, optical disk or semiconductor storage device. The program for analyzing and searching media information may be stored on one or more of the portable computer-readable tangible storage devices 220, read via the R/W drive or interface 218, and loaded into the computer-readable tangible storage device(s) 208.

The internal components may also include network adapters, also known as switch port cards, or interfaces 222 such as a TCP/IP adapter cards, wireless Wi-Fi interface cards, 3G or 4G wireless interface cards, or other wired or wireless communication links. The program for analyzing and searching media information may be downloaded from an external computer, e.g., a server, via the communications network 104 and the network adapters or interfaces 222. From the network adapters or interfaces 222, the program for analyzing and searching media information may be loaded into the tangible storage device 208.

The external components may include a computer display monitor 212, a keyboard 214, and a computer mouse 216. The external components may also include touch screens, virtual keyboards, touch pads, pointing devices, and other human interface devices. The internal components also include device drivers 210 that interface to the computer display monitor 212, keyboard 214, and computer mouse 216. The device drivers 210, R/W drive or interface 218, and network adapter or interface 222 are implemented in hardware and software stored in the tangible storage device 208 and/or ROM 206.

Figure 3:
FIG. 3 and FIG. 6 are views of search results displayed on a communication device in accordance with an exemplary embodiment.

A view of search results displayed on a communication device in accordance with an embodiment is shown in FIG. 3. The user has a communication device 102 that is a tablet computer in this example. The user causes the communication device 102 to display a search application 302, such as shown in FIG. 3. The search application facilitates the user entering one or more search terms, key words, or a search query 304. The search query is "architecture diagram from meeting videos" in this example. Based on the search query 304, information in the form of text is 306 is received and displayed. In the example of FIG. 3, the user was looking for an architecture diagram, but received information in the form of text.

Figure 4:
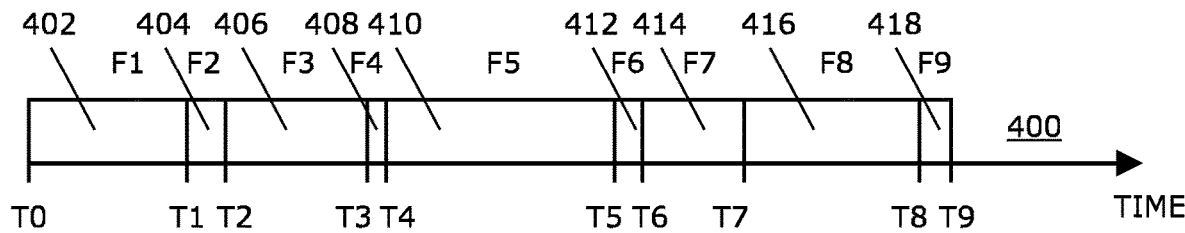
FIG. 4 is a timing diagram of a media file divided into plurality of fragments in accordance with an exemplary embodiment.

A timing diagram of a media file divided into plurality of fragments is shown in FIG. 4 in accordance with an exemplary embodiment. A media file 400 is divided into a plurality of fragments F1 402, F2 404, F3 406, F4 408, F5 410, F6 412, F7 414, F8 416, and F9 418. The media file may be a video file, an audio file, an image file, a text file, or other non-text file.

Figure 5:
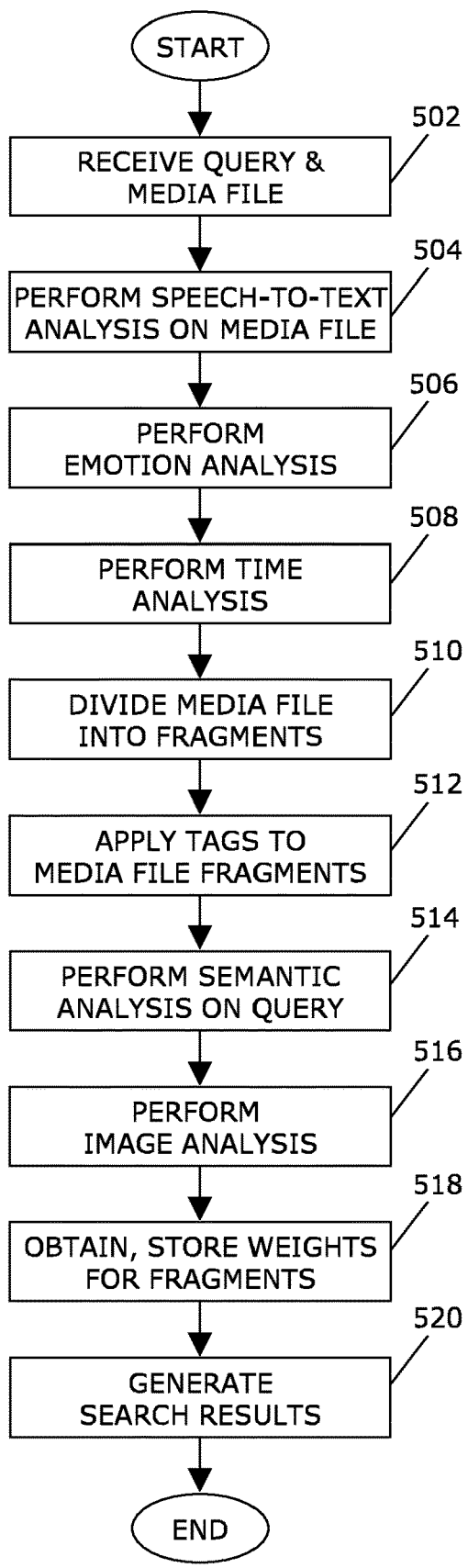
FIG. 5 is a flowchart illustrating a method of analyzing and searching media information in accordance with an exemplary embodiment.

A flowchart illustrating a method of analyzing and searching media information in accordance with an embodiment is shown in FIG. 5. A search query 304 and a media file 400 related to the search query are received 502 by the system 106 from a communication device 102. The system 106 processes and analyzes the search query with one or more search algorithms to identify the media file 400. The media file 400 may be at least partially processed prior to receiving a search query, for example, when the media file 400 is stored. Alternatively, some or all of the processing of the media file 400 may be done in real time, e.g., after receiving the search query. The system 106 performs speech-to-text analysis, also referred to as speech-to-text conversion, 504 on the media file 400, yielding text.

The system 106 performs emotion analysis 506 on the media file 400. Emotion analysis may be performed on the audio, images, and/or emotion-based keywords. Emotion analysis may be performed, for example, by identifying any of the intensity of discussions, the absence of discussions or silences, raised voices, and discussions where particular emotions are identified on the peoples' faces, large physical gestures by a person, such as raising a fist, kicking, or jumping, tone of voice, and so forth. Intense discussions or audio may include an amplitude exceeding a threshold; detection of predetermined emotions such as anger or disagreement; detection of large gestures, such as gestures utilizing motions larger than a threshold distance or engaging more than half of a person's body; and so forth. The intensity, length, and other emotion data from the emotion analysis 506 may be included as tags applied to the media file 400.

The system 106 performs time analysis 508 on the media file 400. Performing time analysis may include identifying the beginning and end of each action, identifying the length or duration of an action, change of scenery or background, file-editing action, fragments without audio or sound, and so forth. An action may include a discussion, a physical gesture, a facial expression, a movement by a body part, an action of an object such as a car moving, a slide change during a slide presentation, and so forth.

The system 106 divides 510 the media file 400 into fragments F1 402, F2 404, F3 406, F4 408, F5 410, F6 412, F7 414, F8 416, and F9 418 as shown in the example of FIG. 4. The fragments may be identified, at least in part, by the results of the speech-to-text analysis 504, the results of the emotion analysis performed 506 on the media file 400, such as emotion analysis performed 506 on the audio or images from the media file 400, and time analysis 508 performed on the media file. For example, keywords, the beginning and end of discussions, presence of facial expressions, and other actions may be utilized to identify fragments of a media file. For example, when the media file 400 is a video file, F2 404, F4 408, F6 412, and F9 418 may be identified as fragments because no audio is present in these sections. F1 402, F3 406, and F5 410 are fragments between fragments where no audio is present. Fragments F1 402 and F5 410 include a low-intensity discussions and fragment F3 406 includes a high intensity discussion based on the amplitude of the audio and increased action by a speaker. F7 414 and F8 416 are identified as fragments because fragment F8 418 begins when a new action begins, e.g., an additional person joins a discussion.

Tags including keywords from the speech-to-text analysis, emotion analysis, and time analysis may be applied 512 to the media file 400 as a whole and/or to relevant fragments F1 402, F2 404, F3 406, F4 408, F5 410, F6 412, F7 414, F8 416, and F9 418. For example, the tags may be added to the metadata for the media file 400. The tags may be applied 512 all at one time or as each tag is generated. The tags may be applied at a time relevant to the tag, e.g., when angry discussion is detected in fragment or to mark the beginning or end of an action in a video file. The tags may be applied before or after the media file 400 is divided 510 into fragments. The tags may be applied in real time, e.g., after the query is received, or may be applied prior to receiving a query.

Semantic analysis is performed 514 on the search query. The system 106 identifies the user's intention(s) or purpose of the search query by semantic analysis 514. The identified intention(s) or purpose may be one or more keywords for a concept, an image or picture of an idea, and so forth. For example, an IBM Watson® computing system may be utilized to perform the semantic analysis 514. For example, semantic analysis of the search query 304 of FIG. 3 is "architecture diagram from meeting videos" suggests that the user wants to see an architecture diagram, not text describing architecture diagrams. Further, the user is looking for a specific architecture diagram from videos of a meeting. Image analysis 516 may optionally be performed on one or more of the fragments F1 402, F2 404, F3 406, F4 408, F5 410, F6 412, F7 414, F8 416, and F9 418 resulting in keywords that identify objects or actions in the media file 400. For example, an IBM Watson® computing system may be utilized to perform the image analysis 516. The keywords may be added as tags to the fragments. For example, image analysis may be performed on F3 406, F5 410, and F7 414 because presentations on a video screen are included in these fragments.

Weights are obtained 518 for each of the fragments F1 402, F2 404, F3 406, F4 408, F5 410, F6 412, F7 414, F8 416, and F9 418 based on the semantic analysis, emotion analysis, and time analysis. Weights may be assigned based on the semantic analysis of the search query. For example, weights may be different for the same keywords when one query looks for still scenes while another query looks for action scenes. Optionally, the image analysis and speech-to-text results may be used to determine weights or to distinguish between fragments having similar weights. Advantageously, lower weights provide less meaningful results to the user, and higher weights provide more meaningful results to the user. For example, lower weights may be assigned to shorter fragments based on a time threshold, fragments without audio or sound, fragments with lower intensity discussions, fragments with minimal or no action, fragments that match fewer keywords, fragments with no emotions, and so forth. Medium weights may be assigned to average length fragments based on a time threshold, fragments with average intensity discussions, fragments with small actions, fragments that match some but not all keywords, fragments with a few emotions, and so forth. Higher weights may be assigned to longer fragments based on a time threshold, fragments with more audio or sound, fragments with higher intensity discussions, fragments with more actions or gestures, fragments that match more keywords, fragments that contain more emotion-based keywords, fragments with numerous emotions, and so forth. The weights are stored in association with the relevant fragment.

Lower weights are assigned to fragments F2 404, F4 408, F6 412, and F9 418 in the example of FIG. 4 because no audio was detected in these fragments. No audio or no sound may indicate less meaning in the fragment. Medium weights are assigned to fragments F3 406 and F7 414 because no diagrams were detected in these fragments with image analysis although the discussions mentioned architecture diagrams. Fragment F5 410 is assigned a high weight because the discussion was of higher amplitude or intensity and at least one image including diagrams was detected in the fragment. More than three levels of weights may be utilized. Weights may be whole numbers, e.g., 1, 2, 3, 4, and so forth; fractions or decimal numbers, e.g., ¼, ½, ¾, and so forth or 0.1, 0.2, 0.3, 0.4, 0.5, and so forth, letters, e.g., A, B, C, D, and so forth, or any other weighting system.

Figure 6:
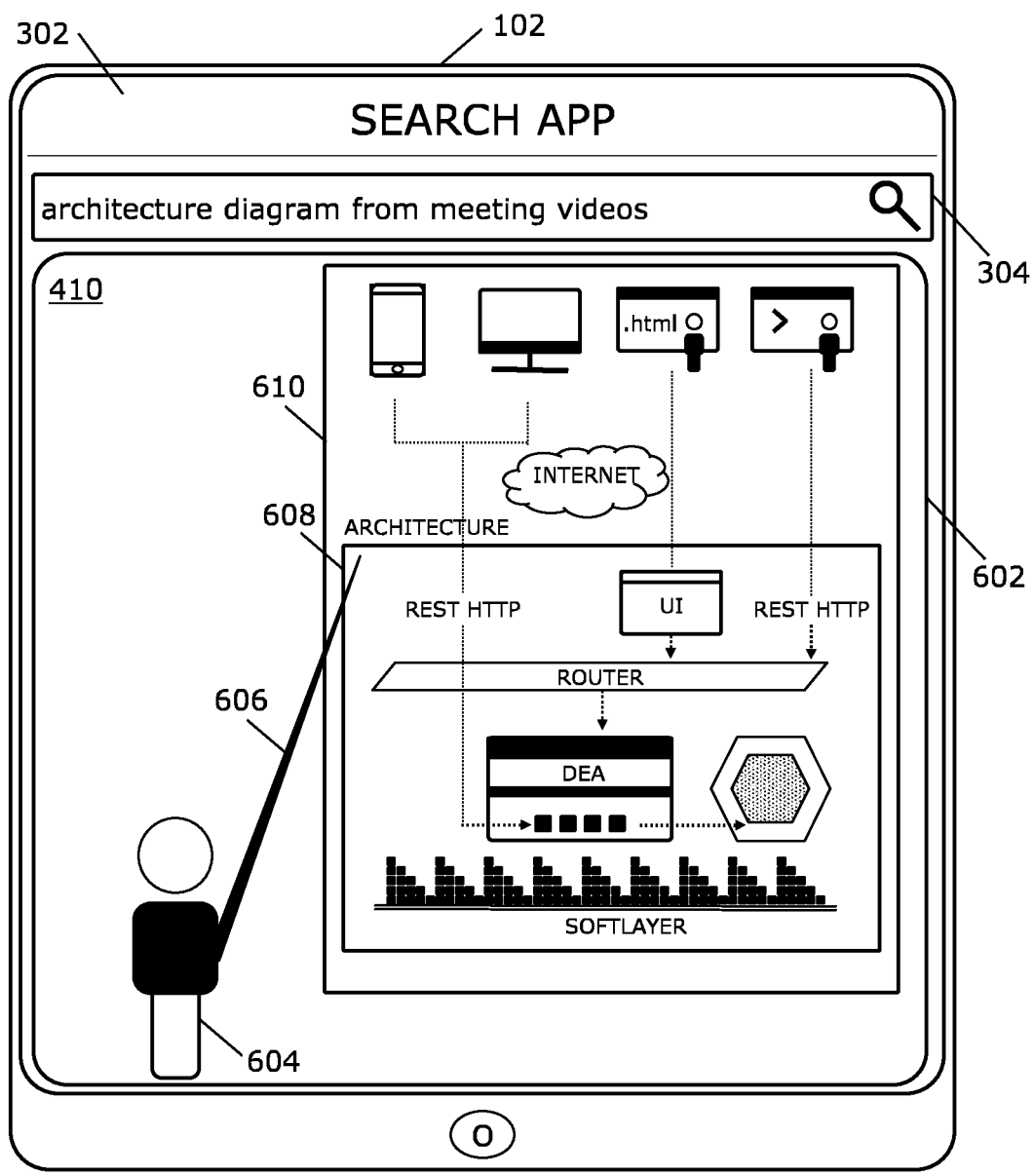

Search results are generated 520 based on the weights. One or more fragments may be presented to the user as search results. Multiple search results may be advantageously ordered from high weight to low weight. When multiple fragments have the same weight, a tie may be broken based on how many keywords match the query from each fragment, how many of the keywords are matched from each fragment, or other criteria. In this example, fragment F5 410 is provided to the user at the top of the list. A frame 602 from fragment F5 410 is provided to the user, as shown in FIG. 6. As shown in the frame 602, a presenter 604 uses a pointer 606 to indicate an architecture diagram 608 on a display screen 610. Alternatively, the media file 401 may be provided to the user with a time line that displays indicators of where more relevant information may be found. For example, the fragments of the time line corresponding to the highest weights may be highlighted in red, the fragments of the time line corresponding to the middle weights may be highlighted in yellow, and the fragments of the time line corresponding to the lowest weights may be highlighted in gray or not highlighted.

By combining semantic analysis, emotion analysis, and time analysis to obtain weights for fragments of the media file, more relevant information may be obtained for a search query than simple text searching provides. The combination also provides a quicker way of processing large amounts of data while narrowing down the amount of data or information relevant to the search results.

According to one or more embodiments, a method comprises performing, by a data processing system, speech-to-text analysis, emotion analysis, and time analysis on a media file and dividing, by the data processing system, the media file into a first fragment and a second fragment based at least in part on the speech-to-text analysis, the emotion analysis, and the time analysis. Semantic analysis is performed, by the data processing system, on the first fragment and the second fragment based on a search query for the media file. A first weight is provided for the first fragment and a second weight is provided for the second fragment based on the semantic analysis, the emotion analysis, and the time analysis by the data processing system. Which of the first fragment and the second fragment has the highest weight is identified by the data processing system. A lower weight may be assigned to the first fragment when the first fragment comprises no audio, and the lower weight may be assigned to the second fragment when the second fragment comprises no audio. A higher weight may be assigned to the first fragment when the first fragment comprises intense audio, and the higher weight may be assigned to the second fragment when the second fragment comprises intense audio. Performing time analysis may comprise identifying a beginning and an end of action in the media file. The data processing system may store the first weight in association with the first fragment and the second weight in association with the second fragment. The plurality of fragments may be communicated to a communication device with a highest weight fragment as most relevant. Image analysis may be performed on the first fragment and the second fragment. The media file may be one of a video file and an audio file.

According to one or more embodiments, a media analysis system comprises a network adapter configured to receive, from a communication device, a search query and to communicate information associated with the search query to the communication device. At least one processor is arranged and constructed to perform speech-to-text analysis, emotion analysis, and time analysis on a media file; divide the media file into a plurality of fragments based at least in part on the speech-to-text analysis, the emotion analysis, and the time analysis; perform semantic analysis on the plurality of fragments based on the search query for the media file; provide a plurality of weights for the plurality of fragments based on the semantic analysis, the emotion analysis, and the time analysis; order the plurality of fragments according to weight; and communicate the plurality of fragments to the communication device with the highest weight fragment as most relevant. A lower weight may be assigned to at least one of the plurality of fragments when the at least one of the plurality of fragments comprises no audio. A higher weight may be assigned to at least one of the plurality of fragments when the at least one of the plurality of fragments comprises intense audio. Performing time analysis may comprise identifying a beginning and an end of action in the media file. Performing time analysis may comprise identifying discussions longer than a threshold. Image analysis may be performed on at least one of the plurality of fragments. The media file may be one of a video file and an audio file.

According to one or more embodiments, a computer program product for a media analysis system comprises a computer readable storage medium having program instructions embodied therein, wherein the program instructions are executable by a device to cause the device to: perform speech-to-text analysis, emotion analysis, and time analysis on a media file; divide the media file into a plurality of fragments based at least in part on the speech-to-text analysis, the emotion analysis, and the time analysis; perform semantic analysis on the plurality of fragments based on a search query for the media file; provide a plurality of weights for the plurality of fragments based on the semantic analysis, the emotion analysis, and the time analysis; communicate the plurality of fragments according to weight. A lower weight may be assigned to at least one of the plurality of fragments when the at least one of the plurality of fragments comprises no audio. A higher weight may be assigned to at least one of the plurality of fragments when the at least one of the plurality of fragments comprises intense audio. Performing time analysis may comprise identifying a beginning and an end of action in the media file. Performing time analysis may comprise identifying discussions longer than a threshold. Image analysis may be performed on at least one of the plurality of fragments. The media file may be one of a video file and an audio file.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, the numeral references to the same or like components or steps.

The terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract is provided to allow a reader to quickly ascertain the nature of the technical disclosure. The Abstract is submitted with the understanding that the Abstract will not be used to interpret or limit the scope or meaning of the claims. In the foregoing Detailed Description, various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method, performed by a data processing system, comprising:
   receiving a search query and a media file related to the search query;
   performing speech-to-text analysis on a media file;
   performing emotion analysis on the media file by identifying at least one of an intensity of discussion, an absence of discussion, a raised voice, a human expression, or a physical gesture, to include as tags applied to the media file;
   performing time analysis on the media file by identifying at least one of a beginning and an end of each action, a duration of the action, or a change of scenery;
   dividing the media file into a first fragment and a second fragment based at least in part on the speech-to-text analysis, the emotion analysis, and the time analysis;
   performing semantic analysis on the first fragment and the second fragment based on an intention of the search query for the media file;
   providing a first weight for the first fragment and a second weight for the second fragment based on the semantic analysis, the emotion analysis, and the time analysis;
   ordering search results based on the weight of the corresponding segment;
   providing the media file with a timeline with fragments in different identifiers based on weights; and
   storing the first weight in association with the first fragment and the second weight in association with the second fragment.

2. The method of claim 1, further comprising assigning a lower weight to the first fragment when the first fragment comprises no audio and assigning the lower weight to the second fragment when the second fragment comprises no audio.

3. The method of claim 1, further comprising assigning a higher weight to the first fragment when the first fragment comprises an above average intense audio and assigning the higher weight to the second fragment when the second fragment comprises above average intense audio.

4. The method of claim 1, wherein performing time analysis comprises identifying a beginning and an end of action in the media file.

5. The method of claim 1, further comprising communicating the plurality of fragments to a communication device with a highest weight fragment as most relevant.

6. The method of claim 1, further comprising performing image analysis on the first fragment and the second fragment.

7. The method of claim 1, wherein the media file is one of a video file and an audio file.

8. The method of claim 1, further comprising providing a media file with a time line that displays indicators based on the weight of each corresponding segment.

9. A media analysis system comprising:
   a network adapter configured to receive, from a communication device, a search query and to communicate information associated with the search query to the communication device;
   at least one processor arranged and constructed to:
      receive a search query and a media file related to the search query;
      perform speech-to-text analysis on a media file;
      perform emotion analysis on the media file by identifying at least one of an intensity of discussion, an absence of discussion, a raised voice, a human expression, or a physical gesture, to include as tags applied to the media file;
      perform time analysis on the media file by identifying at least one of a beginning and an end of each action, a duration of the action, or a change of scenery;
      divide the media file into a plurality of fragments based at least in part on the speech-to-text analysis, the emotion analysis, and the time analysis;
      perform semantic analysis on the plurality of fragments based on an intention of the search query for the media file;
   provide a plurality of weights for the plurality of fragments based on the semantic analysis, the emotion analysis, and the time analysis;
      order search results based on the weight of the corresponding segment;
      provide the media file with a timeline with fragments in different identifiers based on weights;
      order the plurality of fragments according to weight; and
      communicate the plurality of fragments to the communication device with the highest weight fragment as most relevant.

10. The media analysis system of claim 9, wherein a lower weight is assigned to at least one of the plurality of fragments when the at least one of the plurality of fragments comprises no audio.

11. The media analysis system of claim 9, wherein a higher weight is assigned to at least one of the plurality of fragments when the at least one of the plurality of fragments comprises an above average intense audio.

12. The media analysis system of claim 9, wherein performing time analysis comprises identifying a beginning and an end of action in the media file.

13. The media analysis system of claim 9, wherein performing time analysis comprises identifying discussions longer than a threshold.

14. The media analysis system of claim 9, further comprising performing image analysis on at least one of the plurality of fragments.

15. The media analysis system of claim 9, wherein the media file is one of a video file and an audio file.

16. The media analysis system of claim 9, wherein the at least one processor is further arranged and constructed to store the plurality of weights in association with the plurality of fragments.

17. A computer program product for a media analysis system, the computer program product comprising a computer readable storage medium having program instructions embodied therein, wherein the program instructions are executable by a device to cause the device to:
- receive a search query and a media file related to the search query;
- perform speech-to-text analysis on a media file;
- perform emotion analysis on the media file by identifying at least one of an intensity of discussion, an absence of discussion, a raised voice, a human expression, or a physical gesture, to include as tags applied to the media file;
- perform time analysis on the media file by identifying at least one of a beginning and an end of each action, a duration of the action, or a change of scenery;
- divide the media file into a first fragment and a second fragment based at least in part on the speech-to-text analysis, the emotion analysis, and the time analysis;
- perform semantic analysis on the plurality of fragments based on an intention of the search query for the media file;
- provide a plurality of weights for the plurality of fragments based on the semantic analysis, the emotion analysis, and the time analysis;
- provide the media file with a timeline with fragments in different identifiers based on weights;
- order search results based on the weight of the corresponding segment; and
- communicate the plurality of fragments according to weight.

18. A computer program product of claim 17, wherein a lower weight is assigned to at least one of the plurality of fragments when the at least one of the plurality of fragments comprises no audio.

19. The computer program product of claim 17, wherein a higher weight is assigned to at least one of the plurality of fragments when the at least one of the plurality of fragments comprises an above average intense audio.

20. The computer program product of claim 17, wherein performing time analysis comprises identifying a beginning and an end of action in the media file.

21. The computer program product of claim 17, wherein performing time analysis comprises identifying discussions longer than a threshold.

* * * * *